United States Patent [19]

Matsumoto et al.

[11] 3,894,267

[45] July 8, 1975

[54] CONVERGENCE CORRECTION DEVICE

[75] Inventors: Shuzo Matsumoto; Ryoichi Hirota, both of Yokohama, Japan

[73] Assignee: Hitachi, Ltd., Japan

[22] Filed: Aug. 27, 1973

[21] Appl. No.: 391,847

[30] Foreign Application Priority Data

Aug. 25, 1972 Japan ................................ 47-84598

[52] U.S. Cl. ................................ 315/368; 315/13 C

[51] Int. Cl. ......................... H01j 29/70; H01j 29/76

[58] Field of Search ........ 333/78; 315/31 R, 31 TV, 315/13 C, 13 CG, 368

[56] References Cited

UNITED STATES PATENTS

| | | | |
|---|---|---|---|
| 2,880,361 | 3/1959 | Massman | 315/13 C |
| 2,910,618 | 10/1959 | Vasilevskis | 315/13 C |
| 3,002,120 | 9/1961 | Clay | 315/13 C |
| 3,048,740 | 8/1962 | Nelson | 315/31 TV |

*Primary Examiner*—Richard A. Farley
*Assistant Examiner*—T. M. Blum
*Attorney, Agent, or Firm*—Craig & Antonelli

[57] ABSTRACT

A convergence correction device comprises a horizontal convergence correction coil; a vertical convergence correction coil; a means for providing the horizontal and vertical convergence correction coils on a core so as to cause substantially the same magnetic flux to link with both the coils; a means for connecting a first current source to generate a correcting current having the same period as the horizontal scanning period, with the terminals of the horizontal convergence correction coil; a means for connecting a second current source to generate a correcting current having the same period as the vertical scanning period, with the terminals of the vertical convergence correction coil; and a means for inserting a circuit which has a high impedance to the current from the first current source but a low impedance to the current from the second current source, between the vertical convergence correction coil and the second current source, or a circuit which has a high impedance to the current from the second current source but a low impedance to the current from the first current source, between the horizontal convergence correction coil and the first current source.

In case where a circuit which has a high impedance to the current having the horizontal scanning period but a low impedance to the current having the vertical scanning period, is inserted between the vertical convergence correction coil and the current source to generate the correcting current having the vertical scanning period, the correcting current having the horizontal scanning period is prevented from flowing through the vertical convergence correction circuit so that the horizontal convergence correcting current can be effectively supplied for the horizontal convergence correction circuit.

8 Claims, 5 Drawing Figures

CONVERGENCE CORRECTION DEVICE

FIELD OF THE INVENTION

The present invention relates to a convergence correction device for a color television receiver, and more particularly to an electromagnetic convergence correction device in which correction currents can be effectively supplied for horizontal and vertical convergence correction coils.

DESCRIPTION OF THE PRIOR ART

Figure 1:
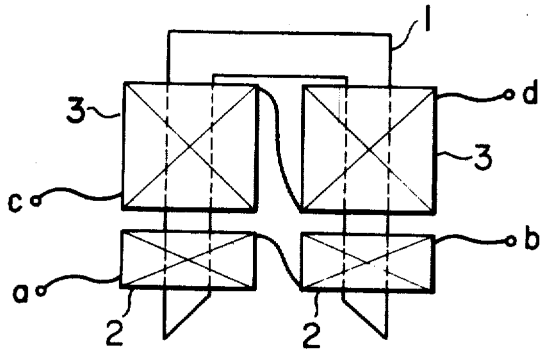
FIG. 1 PRIOR ART
FIG. 1 is a front view of a convergence correction coil used in a conventional convergence correction device.

A conventional convergence correction device as shown in FIG. 1 consists of a U-shaped core 1, a horizontal convergence correction coil 2 and vertical convergence correction coil 3, which are both wound about the U-shaped core 1, and in order to perform the dynamic convergence correction with this type of device horizontal period correcting current (parabola current) must be fed through the horizontal convergence coil 2 ($a - b$) while vertical period correcting current (parabola current) must be supplied for the vertical convergence coil 3 ($c - d$). However, since in this device the horizontal and vertical convergence correction coils 2 and 3 are wound about the same core 1, the transformer action takes place between the coils 2 and 3, so that the currents supplied for the convergence coils 2 and 3 are adversely diminished.

Figure 2:
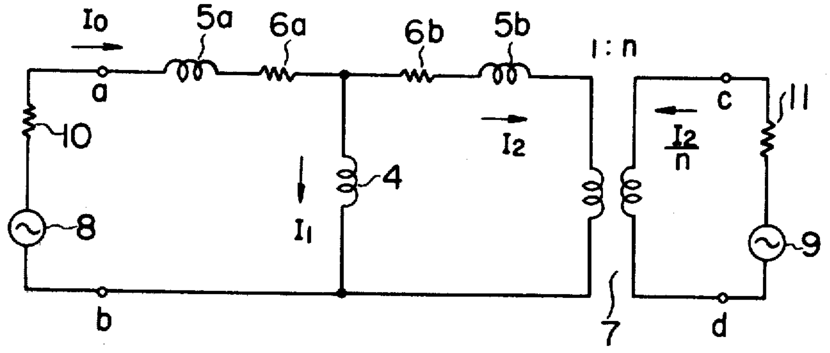
FIG. 2 PRIOR ART
FIG. 2 shows an equivalent circuit of the correction coil shown in FIG. 1.

FIG. 2 is an equivalent circuit of the convergence correction device shown in FIG. 1, as viewed from the terminals of the horizontal convergence correction coil, and with the aid of FIG. 2 is described how the above mentioned drawback is brought about.

The equivalent circuit can be approximated by a combination of an exciting inductance 4 for generating correcting magnetic flux, leakage inductances 5*a* and 5*b*, resistances 6*a* and 6*b* of the coils 2 and 3, and an ideal transformer 7 having turns ratio of $1 : n$. A series circuit of a current source 8 and its internal impedance 10 and a series circuit of a current source 9 and its internal impedance 11 are respectively connected with the terminals *a* and *b* of the horizontal convergence correction coil 2 and the terminals *c* and *d* of the vertical convergence correction coil 3. The current sources 8 and 9 generate currents having parabolic waveforms whose periods are equal respectively to the horizontal and vertical scanning periods. The convergence correction fluxes are generated by introducing the parabolic currents from the sources 8 and 9 into the exciting inductance 4. If an alternating current $I_0$ having a period equal to the horizontal scanning period is caused to flow through the terminal *a*, a current $I_1$ flows through the inductance 4 while a current $I_2$ flows through the primary winding of the transformer 7, so that a current $I_2/n$ whose instantaneous amplitude is one $n$-th of that of the current $I_2$ flowing through the primary winding of the transformer 7 flows between the terminals *c* and *d* due to the transformer action. Accordingly, the current $I_1$ through the exciting inductance 4 equals the supplied current $I_0$ minus the current $I_2$ flowing through the primary winding of the transformer 7. Thus, the convergence correction flux is generated by the current $I_1$ smaller than the supplied current $I_0$ while the current $I_2$ consumed due to the transformer action turns ineffective, so that the efficiency of the device will be degraded.

SUMMARY OF THE INVENTION

One object of the present invention is to provide a new and effective convergence correction device.

Another object of the present invention is to provide a convergence correction device in which correcting current can be effectively supplied for the convergence correction coils.

The convergence correcting device according to the present invention, which has been proposed to attain the above mentioned objects, comprises a horizontal convergence correction coil; a vertical convergence correction coil; a means for providing the horizontal and vertical convergence correction coils on a core so as to cause substantially the same magnetic flux to link with both the coils; a means for connecting a first current source to generate a correcting current having the same period as the horizontal scanning period, with the terminals of the horizontal convergence correction coil; a means for connecting a second current source to generate a correcting current having the same period as the vertical scanning period, with the terminals of the vertical convergence correction coil; and a means for inserting a circuit which has a high impedance to the current from the first current source but a low impedance to the current from the second current source, between the vertical convergence correction coil and the second current source, or a circuit which has a high impedance to the current from the second current source but a low impedance to the current from the first current source, between the horizontal convergence correction coil and the first current source.

With this circuit configuration, the current from the first current source is not supplied for the vertical convergence correction coil while the current from the second current source is not fed to the horizontal convergence correction coil, so that the correcting currents can be effectively supplied for the respective coils.

DESCRIPTION OF THE PREFERRED EMBODIMENTS

Figure 3:
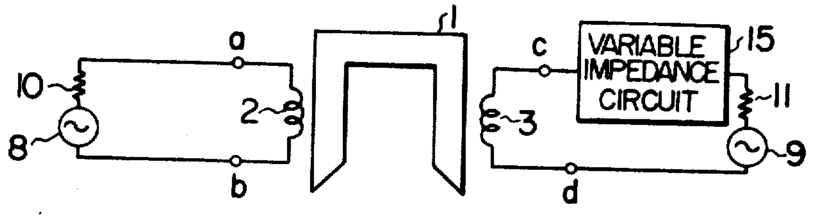
FIG. 3 illustrates the principle of a convergence correction device according to the present invention.

FIG. 3 illustrates the principle of a convergence correction device according to the present invention. In FIG. 3 is shown a circuit 15 whose impedance is high at the frequency of a current source 8, i.e., horizontal scanning frequency, but low at the frequency of a current source 9, i.e., vertical scanning frequency, connected between a vertical convergence correction coil 3 and the current source 9. Namely, so far as the current source 8 is concerned, the circuit consisting of the coil 3, variable impedance circuit 15, the current source 9 and a resistor 11 plays the same role as the coil 3 alone with its terminals *c* and *d* open. Accordingly, no current from the source 8 is supplied through the leakage inductance for the coil 3 and the supplied current $I_0$ flows entirely through a coil 2, i.e., exciting inductance 4 in the equivalent circuit in FIG. 2, so that the correcting current, i.e., current from the source 8, can be effectively used for the purpose of convergence correction.

In general, in case where the present invention is not applied, neither the horizontal convergence correction coil 2 nor the vertical convergence correction coil 3 can be effectively supplied respectively with the correcting current which is parabolic current having the same period as the horizontal scanning period and the correcting current which is a parabolic current having the same period as the vertical scanning period. Especially. the degradation of the efficiency for the horizontal correction current is more remarkable than for the vertical correction current, since the degree of the degradation increases with the increase in frequency. In FIG. 3, therefore, is shown a circuit which can effectively supply the horizontal correction current for the horizontal convergence correction coil 2. However, it is also possible to effectively supply the vertical correction current from the current source 9 for the vertical convergence correction coil 3 if a circuit whose impedance is high to the current from the source 9 but low to the current from the source 8, is connected between the source 8 and the coil 2.

Now, the present invention, whose principle is illustrated in FIG. 3, will be described by way of embodiment with the aid of FIGS. 4 and 5. Throughout the figures, the same reference numerals and characters are applied to like parts or elements as in FIGS. 1 to 3.

Figure 4:
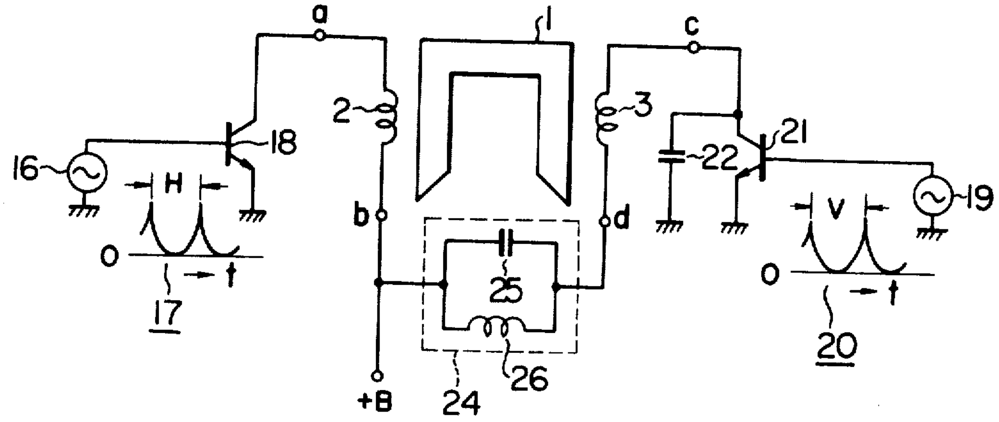
FIG. 4 is a circuit of a convergence correction device as one embodiment of the present invention.

In FIG. 4, a voltage source 16 generates a parabolic voltage 17 having a period equal to the horizontal scanning period H, the voltage 17 is fed to the base of a transistor 18, and a parabolic current is derived from the collector of the transistor 18. The thus obtained parabolic current is supplied for the horizontal convergence correction coil 2. A voltage source 19 generates a parabolic voltage 20 having a period equal to the vertical scanning period V and the voltage 20 is applied to the base of a transistor 21. And from the collector of the transistor 21 is obtained a parabolic current having the period V, which is fed to the vertical convergence correction coil 3. A bypass capacitor 22 serves to prevent the operation of the transistor 21 from being disturbed by the voltage having the period H. A parallel resonance circuit 24 consisting of a capacitor 25 and an inductance 26, is connected between a +B power source and the coil 3. The parallel resonance circuit 24 is so designed as to assume the maximum impedance at the horizontal scanning frequency and the minimum impedance near the vertical scanning frequency. Accordingly, even if the horizontal convergence correction current having the period H causes a voltage having the same period H to be induced across the coil 3 due to the transformer action, the induced voltage cannot create a current flowing through the coil 3. Thus, the degradation of the correction efficiency, which is one of the drawbacks of the prior art convergence correction device, can be eliminated. Therefore, the horizontal correction current can be effectively supplied for the horizontal convergence correction coil 2. Moreover, since the parallel resonance circuit 24 has a sufficiently low impedance at the vertical scanning frequency, the vertical correction current is hardly affected by the circuit 24.

Figure 5:
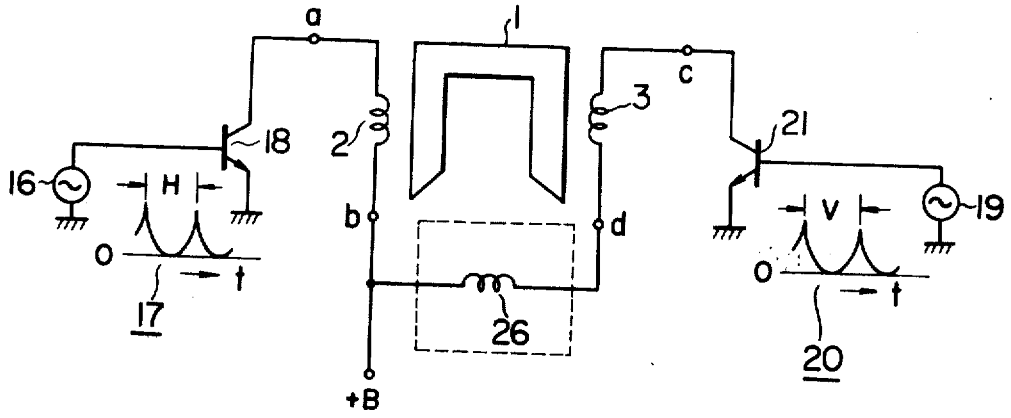
FIG. 5 is a circuit of a convergence correction device as another embodiment of the present invention.

FIG. 5 shows another embodiment of the present invention, in which in place of the resonance circuit 24 is provided an inductance 26 whose impedance is considerably great at the horizontal scanning frequency but sufficiently small in comparison with that of the vertical convergence correction coil 3, at the vertical scanning frequency.

As described above, the embodiments of the present invention can eliminate the drawback that a part of the horizontal correction current is ineffectively consumed due to the part of the horizontal correction current flowing into the vertical convergence correction coil 3. In like manner, the parabolic current having the vertical period V can also be supplied at a high efficiency for the vertical convergence correction coil by connecting between the +B power source and the horizontal convergence correction coil 2 a circuit whose impedance is low to the parabolic current having the horizontal scanning period H but high to the parabolic current having the vertical scanning period V, e.g., parallel resonance circuit consisting of a capacitor and an inductor, whose impedance is low at the horizontal scanning frequency but high at the vertical scanning frequency.

We claim:

1. A convergence correction device comprising a horizontal convergence correction coil; a vertical convergence correction coil; a core on which the horizontal and the vertical convergence correction coils are disposed so as to cause substantially the same magnetic flux to link with both the coils; a first current source providing a correcting current having the horizontal scanning period connected to the terminals of the horizontal convergence correction coil; a second current source providing a correcting current having the vertical scanning period connected to the terminals of the vertical convergence correction coil; and a circuit connected in series with one of the series circuit of the horizontal convergence correction coil and the first current source and the series circuit of the vertical convergence correction coil and the second current source, the circuit having a high impedance at the frequency of the correcting current from the current source which is not connected with the circuit but a low impedance at the frequency of the correcting current from the current source which is connected in series with the circuit.

2. A convergence correction device for a cathode-ray tube system comprising a horizontal convergence correction coil; a vertical convergence correction coil; a core on which the horizontal and the vertical convergence correction coils are disposed so as to cause substantially the same magnetic flux to link with both the coils; a first current source providing a correcting current having a frequency corresponding to the horizontal scanning period of the cathode-ray system connected across said horizontal convergence correction coil; a second current source providing a correcting current having a frequency corresponding to the vertical scanning period of the cathode-ray tube system; means for blocking current having a frequency corresponding to the horizontal scanning period from flowing through said vertical convergence correction coil comprising a circuit whose impedance is high at the frequency of the correcting current from the first current source but low at the frequency of the correcting current from the second current source connected in series with said second current source across said vertical convergence correction coil.

3. A convergence correction device for a cathode-ray tube system comprising a horizontal convergence correction coil; a vertical convergence correction coil; a core on which the horizontal and the vertical convergence correction coils are disposed so as to cause substantially the same magnetic flux to link with both the coils; a first current source providing a correcting current having a frequency corresponding to the horizontal scanning period of the cathode-ray tube system connected to the horizontal convergence correction coil; a second current source providing a correcting current having a frequency corresponding to the vertical scanning period of the cathode-ray tube system connected to the vertical convergence correction coil; and means for blocking current having a frequency corresponding to the horizontal scanning period from flowing through said vertical convergence correction coil comprising a parallel resonance circuit formed of a coil and a capacitor having an impedance which is high at the frequency of the correcting current from the first current source but low at the frequency of the correcting current from the second current source, said parallel resonance circuit being connected between the vertical convergence correction coil and the second current source.

4. A convergence correction device for a cathode-ray tube system comprising a horizontal convergence correction coil; a vertical convergence correction coil; a core on which the horizontal and the vertical convergence correction coils are disposed so as to cause substantially the same magnetic flux to link with both the coils; a first current source providing a correcting current having a frequency corresponding to the horizontal scanning period fo the cathode-ray tube system connected to the horizontal convergence correction coil; a second current source providing a correcting current having a frequency corresponding to the vertical scanning period of the cathode-ray tube system connected to the vertical convergence correction coil; and means for blocking current having a frequency corresponding to the horizontal scanning period from flowing through said vertical convergence correction coil comprising a coil whose impedance is high at the frequency of the correcting current from the first current source but low at the frequency of the correcting current from the second current source, said coil being connected between the vertical convergence correction coil and the second current source.

5. A convergence correction device for a cathode-ray tube system comprising a horizontal convergence correction coil; a vertical convergence correction coil; a core on which the horizontal and the vertical convergence correction coils are disposed so as to cause substantially the same magnetic flux to link with both the coils; a first current source providing a correcting current having a frequency corresponding to the horizontal scanning period of the cathode-ray tube system connected to the horizontal convergence correction coil; a second current source providing a correcting current having a frequency corresponding to the vertical scanning period of the cathode-ray tube system connected to the vertical convergence correction coil; and means for blocking current having a frequency corresponding to the vertical scanning period from flowing through said horizontal convergence correction coil comprising a circuit whose impedance is high at the frequency of the correcting current from the second current source but low at the frequency of the correcting current from the first current source connected in series with said first current source across said horizontal convergence correction coil.

6. A convergence correction device for a cathode-ray tube system comprising a horizontal convergence correction coil; a vertical convergence correction coil; a core on which the horizontal and the vertical convergence correction coils are disposed so as to cause substantially the same magnetic flux to link with both the coils; a first current source providing a correcting current having a frequency corresponding to the horizontal scanning period of the cathode-ray tube system connected to the horizontal convergence correction coil; a second current source providing a correcting current having a frequency corresponding to the vertical scanning period of the cathode-ray tube system connected to the vertical convergence correction coil; and means for blocking current having a frequency corresponding to the vertical scanning period from flowing through said horizontal convergence correction coil comprising a parallel circuit formed of a coil and a capacitor having an impedance which is high at the frequency of the correcting current from the second current source but low at the frequency of the correcting current from the first current source, said parallel resonance circuit being connected between the horizontal convergence correction coil and the first current source.

7. A device as defined in claim 3 wherein one side of said horizontal convergence correction coil is connected to said first current source and the other side thereof is connected to a voltage source, said parallel resonance circuit being connected between one side of said vertical convergence correction coil and said voltage source.

8. A device as defined in claim 4 wherein one side of said horizontal convergence correction coil is connected to said first current source and the other side thereof is connected to a voltage source, said coil being connected between one side of said vertical convergence correction coil and said voltage source.

* * * * *

UNITED STATES PATENT OFFICE
CERTIFICATE OF CORRECTION

Patent No. 3,894,267 Dated July 8, 1975

Inventor(s) Shuzo Matsumoto et al. Page 1 of 2

It is certified that error appears in the above-identified patent and that said Letters Patent are hereby corrected as shown below:

Columns 3 and 4 as shown on the attached sheet should be included, but will apply to the Letters Patent only.

Signed and Sealed this

*ninth* Day of *March 1976*

[SEAL]

*Attest:*

RUTH C. MASON
*Attesting Officer*

C. MARSHALL DANN
*Commissioner of Patents and Trademarks*

$I_0$ flows entirely through a coil 2, i.e., exciting inductance 4 in the equivalent circuit in FIG. 2, so that the correcting current, i.e., current from the source 8, can be effectively used for the purpose of convergence correction.

In general, in case where the present invention is not applied, neither the horizontal convergence correction coil 2 nor the vertical convergence correction coil 3 can be effectively supplied respectively with the correcting current which is parabolic current having the same period as the horizontal scanning period and the correcting current which is a parabolic current having the same period as the vertical scanning period. Especially, the degradation of the efficiency for the horizontal correction current is more remarkable than for the vertical correction current, since the degree of the degradation increases with the increase in frequency. In FIG. 3, therefore, is shown a circuit which can effectively supply the horizontal correction current for the horizontal convergence correction coil 2. However, it is also possible to effectively supply the vertical correction current from the current source 9 for the vertical convergence correction coil 3 if a circuit whose impedance is high to the current from the source 9 but low to the current from the source 8, is connected between the source 8 and the coil 2.

Now, the present invention, whose principle is illustrated in FIG. 3, will be described by way of embodiment with the aid of FIGS. 4 and 5. Throughout the figures, the same reference numerals and characters are applied to like parts or elements as in FIGS. 1 to 3.

In FIG. 4, a voltage source 16 generates a parabolic voltage 17 having a period equal to the horizontal scanning period H, the voltage 17 is fed to the base of a transistor 18, and a parabolic current is derived from the collector of the transistor 18. The thus obtained parabolic current is supplied for the horizontal convergence correction coil 2. A voltage source 19 generates a parabolic voltage 20 having a period equal to the vertical scanning period V and the voltage 20 is applied to the base of a transistor 21. And from the collector of the transistor 21 is obtained a parabolic current having the period V, which is fed to the vertical convergence correction coil 3. A bypass capacitor 22 serves to prevent the operation of the transistor 21 from being disturbed by the voltage having the period H. A parallel resonance circuit 24 consisting of a capacitor 25 and an inductance 26, is connected between a +B power source and the coil 3. The parallel resonance circuit 24 is so designed as to assume the maximum impedance at the horizontal scanning frequency and the minimum impedance near the vertical scanning frequency. Accordingly, even if the horizontal convergence correction current having the period H causes a voltage having the same period H to be induced across the coil 3 due to the transformer action, the induced voltage cannot create a current flowing through the coil 3. Thus, the degradation of the correction efficiency, which is one of the drawbacks of the prior art convergence correction device, can be eliminated. Therefore, the horizontal correction current can be effectively supplied for the horizontal convergence correction coil 2. Moreover, since the parallel resonance circuit 24 has a sufficiently low impedance at the vertical scanning frequency, the vertical correction current is hardly affected by the circuit 24.

FIG. 5 shows another embodiment of the present invention, in which in place of the resonance circuit 24 is provided an inductance 26 whose impedance is considerably great at the horizontal scanning frequency but sufficiently small in comparison with that of the vertical convergence correction coil 3, at the vertical scanning frequency.

As described above, the embodiments of the present invention can eliminate the drawback that a part of the horizontal correction current is ineffectively consumed due to the part of the horizontal correction current flowing into the vertical convergence correction coil 3. In like manner, the parabolic current having the vertical period V can also be supplied at a high efficiency for the vertical convergence correction coil by connecting between the +B power source and the horizontal convergence correction coil 2 a circuit whose impedance is low to the parabolic current having the horizontal scanning period H but high to the parabolic current having the vertical scanning period V, e.g., parallel resonance circuit consisting of a capacitor and an inductor, whose impedance is low at the horizontal scanning frequency but high at the vertical scanning frequency.

We claim:

1. A convergence correction device comprising a horizontal convergence correction coil; a vertical convergence correction coil; a core on which the horizontal and the vertical convergence correction coils are disposed so as to cause substantially the same magnetic flux to link with both the coils; a first current source providing a correcting current having the horizontal scanning period connected to the terminals of the horizontal convergence correction coil; a second current source providing a correcting current having the vertical scanning period connected to the terminals of the vertical convergence correction coil; and a circuit connected in series with one of the series circuit of the horizontal convergence correction coil and the first current source and the series circuit of the vertical convergence correction coil and the second current source, the circuit having a high impedance at the frequency of the correcting current from the current source which is not connected with the circuit but a low impedance at the frequency of the correcting current from the current source which is connected in series with the circuit.

2. A convergence correction device for a cathode-ray tube system comprising a horizontal convergence correction coil; a vertical convergence correction coil; a core on which the horizontal and the vertical convergence correction coils are disposed so as to cause substantially the same magnetic flux to link with both the coils; a first current source providing a correcting current having a frequency corresponding to the horizontal scanning period of the cathode-ray system connected across said horizontal convergence correction coil; a second current source providing a correcting current having a frequency corresponding to the vertical scanning period of the cathode-ray tube system; means for blocking current having a frequency corresponding to the horizontal scanning period from flowing through said vertical convergence correction coil comprising a circuit whose impedance is high at the frequency of the correcting current from the first current source but low at the frequency of the correcting current from the second current source connected in se-